(12) United States Patent
Brown et al.

(10) Patent No.: US 11,437,152 B1
(45) Date of Patent: Sep. 6, 2022

(54) DIODE ASSEMBLY AND METHOD OF FORMING A DIODE ASSEMBLY FOR PULSED FUSION EVENTS

(71) Applicant: Consolidated Nuclear Security, LLC, Oak Ridge, TN (US)

(72) Inventors: Sam W. Brown, Jensen Beach, FL (US); Michael R. Phillips, Harriman, TN (US); William T. Rogerson, Jr., Knoxville, TN (US); Blake F. Scott, Knoxville, TN (US)

(73) Assignee: Consolidated Nuclear Security, LLC, Oak Ridge, TN (US)

( * ) Notice: Subject to any disclaimer, the term of this patent is extended or adjusted under 35 U.S.C. 154(b) by 279 days.

(21) Appl. No.: 16/454,420

(22) Filed: Jun. 27, 2019

(51) Int. Cl.
G21B 1/11 (2006.01)
G21B 1/05 (2006.01)

(52) U.S. Cl.
CPC . G21B 1/11 (2013.01); G21B 1/05 (2013.01)

(58) Field of Classification Search
CPC .... G21B 1/03; G21B 1/05; G21B 1/19; C22B 26/12; C01D 15/00
USPC .......................................... 376/102, 151–152
See application file for complete search history.

(56) References Cited

U.S. PATENT DOCUMENTS

| | | | | |
|---|---|---|---|---|
| 2,986,441 A * | 5/1961 | Alexander | ............... | H05H 6/00 445/14 |
| 4,297,165 A * | 10/1981 | Breuckner | ............... | G21B 1/19 376/103 |
| 4,608,222 A * | 8/1986 | Brueckner | ............... | G21B 1/23 376/104 |
| 4,687,618 A * | 8/1987 | Nuckolls | .................. | G21B 1/19 376/152 |
| 7,634,042 B2 | 12/2009 | Auchterlonie | | |
| 8,493,548 B2 | 7/2013 | Ivanov et al. | | |
| 8,679,224 B2 * | 3/2014 | Brown | .................... | C22B 26/12 75/589 |
| 9,036,765 B2 | 5/2015 | Bimbach | | |
| 9,082,516 B2 | 7/2015 | Slough | | |
| 9,524,802 B2 | 12/2016 | Slough | | |
| 9,670,064 B1 * | 6/2017 | Spencer | ................... | H01M 8/06 |
| 9,682,859 B2 * | 6/2017 | Brown | ..................... | C22B 26/12 |
| 2007/0064857 A1 * | 3/2007 | Winterberg | ............... | G21B 1/01 376/107 |
| 2017/0239633 A1 * | 8/2017 | Brown | ..................... | C22B 26/12 |

(Continued)

OTHER PUBLICATIONS

Oyarzabal, E., A. B. Martin-Rojo, and F. L. Tabares. "Laboratory experiments of uptake and release of hydrogen isotopes in liquid lithium." Journal of Nuclear Materials 463 (2015): 1173-1176. (Year: 2015).*

(Continued)

*Primary Examiner* — Jack W Keith
*Assistant Examiner* — Jinney Kil
(74) *Attorney, Agent, or Firm* — Luedeka Neely Group, P.C.

(57) ABSTRACT

A diode assembly for producing a pulsed fusion event in a z-pinch driver. The diode assembly includes an inner core formed of a fusionable fuel source material including a lithium compound formed of one or more lithium isotopes and one or more hydrogen isotopes. A lithium metal outer sheath is integrally formed around the inner core by decomposing a surface of the fusionable fuel source material.

10 Claims, 7 Drawing Sheets

(56) References Cited

U.S. PATENT DOCUMENTS

2017/0294239 A1* 10/2017 Makhlouf ................ G21B 1/11

OTHER PUBLICATIONS

Pisarev, A., et al. "Deuterium trapping in liquid lithium irradiated by deuterium plasma." Journal of Nuclear Materials 438 (2013): S1076-S1078. (Year: 2013).*
Adams, Robert B., et al., Pulsed Fission-Fusion (PuFF)—Phase I Report, 2014, 52 pages.
Bland, S.N., et al., Implosion and stagnation of wire array Z pinches, Physics of Plasmas, American Institute of Physics, 2007, vol. 14.
Cich, Michael J., et al., Microfabricated Wire Arrays for Z-Pinch, Sandia Report, Sandia National Laboratories, Oct. 2008, 38 pages.
Garner, Ray, Scientists developing pulsed nuclear fusion system for distant missions, Phys.org, Jun. 27, 2012.
Staff writers, Support fusion propulsion research, Space Daily, Jul. 31, 2013.
Unified Code for Nonequilibrium Plasma Systems, Department of Aerospace Engineering, University of Michigan, 2 pages.

* cited by examiner

⁶LITHIUM METAL THICKNESS AS A FUNCTION OF HOLD TIME AND TEMPERATURE

FIG. 7

DIODE ASSEMBLY AND METHOD OF FORMING A DIODE ASSEMBLY FOR PULSED FUSION EVENTS

GOVERNMENT RIGHTS

The U.S. Government has rights to this invention pursuant to contract number DE-NA0001942 between the U.S. Department of Energy and Consolidated Nuclear Security, LLC.

FIELD

The disclosure relates to the field of pulsed fusion events. More particularly, this disclosure relates to a simplified diode assembly containing the fuel material for pulsed fusion events.

BACKGROUND

Nuclear fusion occurs when the atomic nuclei of two or more light atoms collide to make a heavier atom. Following the collision, the total mass of the new atom is less than that of the two atoms that formed it, and the "extra" mass is converted to energy according to the formula $E=mc^2$. In order for fusion to occur, high temperatures and high pressures are required. Under these conditions, atoms are highly excited and are stripped of all their electrons (i.e., ionized), which forms a plasma. The high temperature gives the atoms more kinetic energy, resulting in more collisions. The high pressure causes the atoms to be closer together, making their collision more likely.

Pulsed fusion events are a type of nuclear fusion produced by inertial confinement or compression of a fuel element to very high pressure and temperature conditions in a technique commonly termed "z-pinch." In typical z-pinch drivers, an axial current is applied across a diode assembly formed of a cylindrical array of small, electrically conducting wires disposed around a fuel element. The large voltage across the diode assembly produces very high temperature conditions that subsequently ionizes the material of the electrically conducting wires and produces the plasma. The cylindrical geometry of the wires in the diode assembly causes an inward compression of the wires with respect to the axis of the current, which confines the plasma around the fuel element. A magnetic field around the plasma further induces a high current through the plasma, which generates a Lorentz force on the fuel element to compress the fuel element to fusion conditions. As the plasma is highly conductive, the energy stored in the fuel element is quickly depleted as a result of the high current running through the plasma. Thus, the nuclear fusion that occurs in the z-pinch driver is often referred to as a "pulsed fusion event."

The wire array for producing pulsed fusion events in z-pinch drivers has several weaknesses. In particular, a large number of wires are required to be carefully constructed in the diode assembly to produce a symmetrical plasma. An asymmetrical plasma results in Taylor instabilities, which disrupts the compression symmetry on the fuel element and results in non-fusion conditions. Thus, the wire array is time-consuming and complex to assemble. The precision necessary to construct the wire array combined with its complexity severely limit the frequency of pulsed fusion events able to be produced by a z-pinch driver to one event over multiple days. As should be understood, limits on the number of pulsed fusion events that are possible severely impacts potential applications for z-pinch technology.

Further, because the wire array of the diode assembly must be carefully constructed and inserted into a z-pinch driver in order to produce pulsed fusion events, the materials of the wires are limited to those that can be drawn to fine wires yet strong enough to form the symmetrical wire array. Typical materials used are tungsten and aluminum for the electrically conducting wires. Further applications for z-pinch machines would benefit from a wider selection of materials for the generated plasma.

Accordingly, what is needed is a fuel diode assembly for a z-pinch driver that is more efficient to construct for producing pulsed fusion events while decreasing the duration of time between pulsed fusion events produced by the z-pinch driver. It is also desired to provide a diode assembly that is efficiently made from electrically conducting materials disposed around the fuel element in addition to tungsten and aluminum.

SUMMARY

The present disclosure provides a diode assembly for producing a pulsed fusion event in a z-pinch driver. The diode assembly includes an inner core and a lithium metal outer sheath. The inner core is formed of a fusionable fuel source material including a lithium compound formed of one or more lithium isotopes and one or more hydrogen isotopes. The lithium metal outer sheath is integrally formed around the inner core and in a symmetrical relationship with the inner core by decomposing a surface of the fusionable fuel source material.

According to certain embodiments, the lithium compound of the inner core is selected from a group consisting of $^6$LiD, $^6$LiT, $^7$LiD, and $^7$LiT. In some embodiments, the inner core consists of the lithium compound.

According to certain embodiments, the symmetrical relationship is selected from the group consisting of: the inner core and the lithium metal outer sheath each being cylindrical such that the diode assembly is cylindrical, and the inner core and the lithium metal outer sheath each being a one-dimensional plate such that the diode assembly includes a layered plate arrangement.

According to certain embodiments, the diode assembly further includes a tamper disposed around the lithium metal outer sheath with the tamper including a non-conducting polymer layer disposed around the lithium metal outer sheath and a tamper layer disposed around the non-conducting polymer layer. According to this embodiment, the tamper layer may be selected from a group consisting of uranium, platinum, tungsten, niobium, molybdenum, osmium, rhenium, and combinations thereof.

According to certain embodiments, the diode assembly further includes a tamper layer disposed around the electrically conducting outer sheath with the tamper layer including an electrical conductance less than the electrical conductance of the electrically conducting outer sheath. According to this embodiment, the tamper layer may be selected from a group consisting of uranium, platinum, tungsten, niobium, molybdenum, osmium, rhenium, and combinations thereof. In certain embodiments, the tamper layer includes $^{238}$U.

According to another embodiment of the disclosure, a method of forming a diode assembly for producing a pulsed fusion event in a z-pinch driver includes: providing a fusionable fuel source material including a lithium compound formed of one or more lithium isotopes and one or more hydrogen isotopes; heating the fusionable fuel source material under controlled conditions in a vacuumed environment such that a surface of the fusionable fuel source material decomposes to lithium metal and a hydrogen isotopic gas; and extracting the hydrogen isotopic gas from the vacuumed environment such that a lithium metal outer sheath is integrally formed around the fusionable fuel source material.

According to certain embodiments, the fusionable fuel source material is selected from a group consisting of $^6$LiD, $^6$LiT, $^7$LiD, and $^7$LiT.

According to certain embodiments, the controlled conditions include a vapor pressure ranging from about 2.2 torr to about 11.1 torr.

According to certain embodiments, the surface of the fusionable fuel source material is heated to a temperature ranging from about 400° C. to about 680° C.

According to certain embodiments, the surface of the fusionable fuel source material is heated to a temperature ranging from about 600° C. to about 660° C.

According to certain embodiments, the controlled conditions include a vapor pressure ranging from about 2.2 torr to about 11.1 torr and the surface of the fusionable fuel source material being heated to a temperature ranging from about 400° C. to about 680° C. According to this embodiment, the heating step may further include raising the vapor pressure of the vacuumed environment as the temperature of the surface of the fusionable fuel source material increases.

According to certain embodiments, the method further includes controlling a thickness of the lithium metal outer sheath between about ten microns and about 150 microns by selecting the controlled conditions to include a temperature between about 560° C. to about 660° C. and a heating time between about one hour to about three hours.

According to certain embodiments, the method further includes controlling a thickness of the lithium metal outer sheath such that the lithium metal outer sheath of the formed diode assembly includes a mass that is substantially equal to a mass of the fusionable fuel source material.

According to certain embodiments, the heating and extracting steps are performed in a sealed vessel having a separator disposed between the fusionable fuel source material and an interior surface of the sealed vessel.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

In the following detailed description of the preferred and other embodiments, reference is made to the accompanying drawings, which form a part hereof, and within which are shown by way of illustration the practice of a specific embodiment of a diode assembly for a z-pinch driver. It is to be understood that other embodiments may be utilized, and that structural changes may be made and processes may vary in other embodiments.

Figure 1:
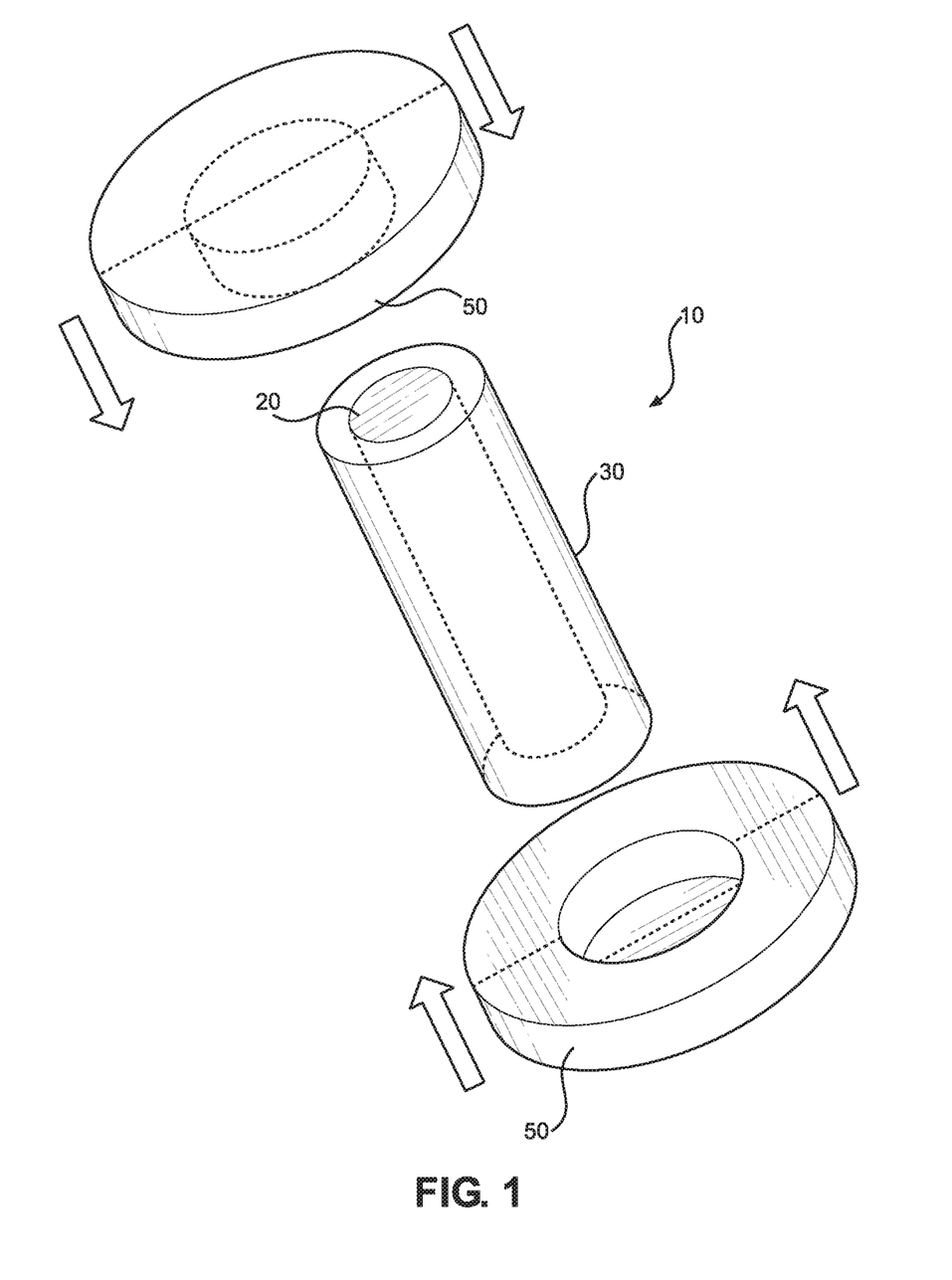
FIG. 1 depicts a cylindrical diode assembly for insertion between electrical clamping devices according to one embodiment of the present disclosure.

Referring to FIG. 1, a diode assembly 10 for a z-pinch driver is depicted according to an exemplary embodiment of the disclosure. The diode assembly 10 includes an inner core 20 formed of a fusionable fuel source material and an electrically conducting outer sheath 30 disposed around the inner core 20. According to certain embodiments, the diode assembly 10 is electrically connected to an existing z-pinch driver using any number of electrical connections as known in the art. For example, FIG. 1 depicts electrical clamping devices 50 that would typically be components of the z-pinch driver itself. According to this embodiment, a diode assembly 10 would be inserted between the clamping devices 50 and the clamping devices would be closed/clamped around opposing ends of the diode assembly 10 for electrically connecting the diode assembly 10 to the z-pinch driver. It is noted that the clamping devices 50 are shown in the closed/clamped position in FIG. 1. However, in preferred operation, the clamping devices would be in an open position by spreading each of the devices 50 along the dashed horizontal lines when initially receiving the opposing ends of the diode assembly 10 and then moved to the closed/clamped position to electrically connect the diode assembly 10 to the z-pinch driver. According to certain embodiments, the z-pinch driver may also include a magazine type feeding device (not depicted) disposed between the electrical clamping devices 50 for fast and repetitive loading of diode assemblies 10 to the z-pinch driver.

In operation, electrical current is generated by the z-pinch driver and passed through the clamping devices 50 at an extremely high voltage to cause the metal of the electrically conducting outer sheath 30 to generate a plasma. A magnetic field (also supplied by the z-pinch driver) then induces a current in the plasma, which compresses the plasma of the electrically conducting outer sheath 30 around the inner core 20 of fusionable fuel material. Compression of the plasma around the inner core 20 in-turn compresses the inner core 20 to temperatures and pressures sufficient to produce a fusion event for generating energy. As the present diode assembly is preferably intended for generating pulsed fusion events in a z-pinch driver (i.e., where pure fusion plasma is compressed as compared to compressing a fission-fusion plasma), the inner core 20 will preferably exclude any type of fissionable material such as $^{235}$U, $^{238}$U, or $^{239}$Pu. In this regard, while a fission/fusion reaction is easier to start, the fission materials are less energetic and produce highly radioactive byproducts that make it hazardous working around the diode assembly both before and after the nuclear event.

Figure 2A:
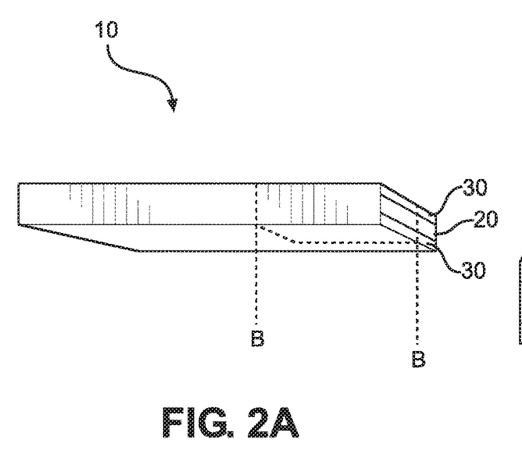
FIG. 2A depicts a diode assembly having a layered plate arrangement according to another embodiment of the disclosure.
Figure 2B:
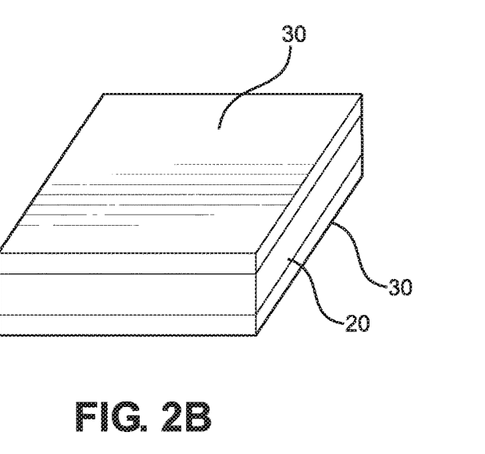
FIG. 2B depicts a cut-out B-B portion of the diode assembly of FIG. 2A that has been rotated for clarity.

In preferred embodiments, the electrically conducting outer sheath 30 and the inner core 20 are closely coupled to eliminate or otherwise significantly reduce the potential losses due to compression instabilities and other factors. In addition, the electrically conducting outer sheath 30 is preferably arranged in a symmetrical geometry around the inner core 20. For example, according to certain embodiments, the electrically conducting outer sheath 30 is cylindrical and compressed around a corresponding cylindrical inner core 20 to form a cylindrical diode assembly 10 as depicted in FIG. 1. According to another embodiment as depicted in FIG. 2A, the diode assembly 10 includes a plate geometry. Referring to FIG. 2B, which depicts a portion of the diode assembly of FIG. 2A, the outer sheath 30 of this embodiment is in the form of one-dimensional plates compressed against a corresponding inner core 20 plate to form a symmetrical geometry having a layered plate arrangement. For purposes of the present disclosure, the term "one-dimensional" refers to compression in a single coordinate direction (as compared to the two-dimensional compression of the cylindrical embodiment of FIG. 1 in two separate coordinate directions). It should also be understood that other symmetrical relationships such as spheres are believed possible and within the scope of the present disclosure. As a result of the symmetrical relationship between the outer sheath 30 and the inner core 20, the resulting plasma implosion will be symmetrical and the resulting Lorentz force will compress the inner core 20 to fusion pressures and temperatures while minimizing Taylor instability issues.

As noted above, fusion of atoms after being stripped of electrons occurs at high temperatures and high pressures. As the atoms no longer have electrons, the atoms carry a positive charge. The higher the mass of the atom (i.e., the higher number of protons of the atom), the greater the positive charge for that atom and the higher pressure/temperature required to force the atoms to fuse together. Thus, low mass atoms (e.g., hydrogen isotopes) are the optimum fuel options for the inner core 20 due to the lower temperature and pressure conditions necessary for fusion conditions by the z-pinch driver using diode assembly 10. For example, hydrogen isotopes require temperatures around 10,000,000° K and pressure densities around 100 g/cc to achieve fusion conditions. On the other hand, helium isotopes (which contain only one additional proton) require temperatures around 100,000,000° K and pressure densities around 100,000 g/cc to achieve fusion conditions. Accordingly, while various materials of the inner core 20 may theoretically be used for diode assembly 10, the inner core 20 is preferably formed of materials that contain hydrogen isotopes and compounds that form hydrogen isotopes upon neutron decay.

Under fusion conditions, the hydrogen isotopes of deuterium and tritium release energy according to the following equations (where D is the hydrogen isotope of deuterium; T is the hydrogen isotope of tritium; He is the helium 4 isotope; N is a neutron; and P is a proton):

$$^{2}_{1}D + ^{3}_{1}T \rightarrow ^{4}_{2}He(3.5 \text{ MeV}) + N^{0}(14.1 \text{ MeV}) \qquad \text{Eq. 1}$$

$$^{2}_{1}D + ^{2}_{1}D \rightarrow ^{3}_{1}T(1.01 \text{ MeV}) + P^{+}(3.02 \text{ MeV})(50\% \text{ probability}) \qquad \text{Eq. 2a}$$

$$^{2}_{1}D + ^{2}_{1}D \rightarrow ^{3}_{2}He(0.82 \text{ MeV}) + N^{0}(2.45 \text{ MeV})(50\% \text{ probability}) \qquad \text{Eq. 2b}$$

$$^{3}_{1}T + ^{3}_{1}T \rightarrow ^{4}_{2}He + 2N^{0} + 11.3 \text{ MeV} \qquad \text{Eq. 3}$$

In more preferred embodiments, the inner core 20 is formed of a lithium compound having at least one or more lithium isotopes and one or more hydrogen isotopes such as $^{6}LiD$, $^{6}LiT$, $^{7}LiD$, and $^{7}LiT$. Each of these compounds provide the deuterium and tritium needed to produce the reactions in the equations above when subjected to fusion conditions. Further, both lithium-6 and lithium-7 decay by the neutron flux generated through the reactions in above Eqs. 1, 2a, and 3 to increase the tritium population and provide additional tritium fusion fuel through the below equations:

$$^{6}_{3}Li + N^{0} \rightarrow ^{4}_{2}He + ^{3}_{1}T + 4.78 \text{ MeV} \qquad \text{Eq. 4}$$

$$^{7}_{3}Li + N^{0} + 2.47 \text{ MeV} \rightarrow ^{4}_{2}He + ^{3}_{1}T + N^{0} \qquad \text{Eq. 5}$$

In most preferred embodiments, the lithium compound of the inner core 20 is $^{6}LiD$ (i.e., lithium-6 deuteride). $^{6}LiD$ is the optimal fuel source because it has the high neutron capture cross section at low energy levels (940 barns for low energy thermal neutron <5 MeV needed to start the chain reaction). Using $^{6}LiD$ as an example, fusion of the $^{6}LiD$ in the inner core produces tritium and generates 4.78 MeV of energy according to the reaction in Eq. 6 below.

$$^{6}_{3}Li + N^{0} \rightarrow ^{4}_{2}He + ^{3}_{1}H + 4.78 \text{ MeV} \qquad \text{Eq. 6}$$

The energy produced is then divided between the helium and tritium in inverse proportion to their masses, which gives the tritium a higher energy level. Fusion of the resulting tritium and deuterium produces helium and an energetic neutron according to the reaction in Eq. 7 below (the energy is divided between the helium and neutron in inverse proportion to their masses, which gives the neutron most of the energy).

$$^{3}_{1}H + ^{2}_{1}H \rightarrow ^{4}_{2}He + N + 17.588 \text{ MeV} \qquad \text{Eq. 7}$$

The energetic neutron produced by Eq. 7 continues the chain reaction by serving as the initiating neutron in Eq. 6. The helium energy totaled from both equations can be thermalized to produce useful energy.

Another advantage of using a lithium compound having at least one or more lithium isotopes and one or more hydrogen isotopes for the inner core is that adding the lithium compound provides a higher molecular density of the hydrogen isotopes than any phase of the hydrogen isotope by itself. For example, LiD has a theoretical density of 0.789 to 0.791 g/cm³ depending on temperature and pressure with about ¼ of that density (i.e., 0.198 g/cm³) provided by the deuterium atom. On the other hand, the density of even solid phase deuterium (such as produced cryogenically) is typically at about 0.118 g/cm³. Accordingly, utilizing LiD (e.g., $^{6}LiD$ or $^{7}LiD$) as the inner core 20 provides an inner core with a significantly higher hydrogen isotope density (i.e., about 60% higher) than the solid phase of the deuterium isotope. The higher molecular density of the compound of the inner core 20 provides more atoms per unit volume, thereby making fusion collisions more likely to occur. Accordingly, the density of the inner core 20 is preferably at, or as close as possible (>99%) to, the theoretical density of the lithium compound selected for the inner core 20.

With continued reference to FIG. 1, the material for the electrically conducting outer sheath 30 is selected at least in part based on the electrical conductance of the particular metal or metal alloy selected. In this regard, the diode assembly 10 requires that the electrical current supplied by the z-pinch driver flow through the metal outer sheath 30 in order to ionize the outer sheath 30 rather than the inner core 20. As such, it is required for the electrical conductance of the outer sheath 30 to be higher than the electrical conductance of the inner core 20. A non-limiting list of potential candidate materials for the electrically conducting outer sheath 30 is provided in Table 1 below. Table 1 displays the electrical conductance of the candidate materials at room temperature, which is typically the temperature of the materials when the initial electrical current is passed along the outer sheath 30. Table 1 further compares the electrical conductance of the candidate materials to LiH (it is noted that natural lithium hydride has been selected as a reference due to $^6$LiD, $^6$LiT, $^7$LiD, and $^7$LiT not having any known industry standard conductance values).

TABLE 1

Electrical Conductance of Outer Sheath Candidate Materials

| Material | Conductance (S/m × 10$^{-6}$) | Ratio of Conductance referenced to $^6$LiD |
|---|---|---|
| Silver | 63 | 17.2 |
| Copper | 59 | 16.4 |
| Gold | 41 | 11.4 |
| Aluminum | 38 | 10.5 |
| Calcium | 29.8 | 8.3 |
| Tungsten | 17.9 | 5.0 |
| Zinc | 16.9 | 4.7 |
| Lithium Metal | 11 | 3.0 |
| Iron | 10.0 | 2.8 |
| Tin | 9.2 | 2.6 |
| Lead | 4.6 | 1.3 |
| Titanium | 2.4 | 0.7 |
| Mercury | 1.0 | 0.3 |
| LiH | 3.6 | — |

Using the ratio of metal conductance to that of the $^6$LiD inner core 20, silver and copper would be the preferred materials from an electrical standpoint as silver and copper have an electrical conductance that is at least about sixteen times greater than the electrical conductance of LiH. However, other factors in combination with electrical conductance determines the optimum material for the electrically conducting outer sheath 30. Such other factors include cost, plasma density created, ease of manufacturing, chemical stability upon atmospheric products, ability to produce more fusion fuel in situ, ability to increase the neutron population, and/or ability to closely couple the outer sheath 30 with the inner core 20.

According to certain embodiments, the outer sheath 30 is dimensioned and configured to include an outer layer mass that symmetrically approximates the mass of the inner core 20. For purposes of the present disclosure, "symmetrically approximate" refers to the outer sheath 30 including a mass that is within about ±50% of the mass of the inner core 20 at any given point along the length of the diode assembly 10. In a most preferred embodiment, the outer sheath 30 includes a mass that is within about ±25% of the mass of the inner core 20 at any given point along the length of the diode assembly 10. In this regard, the outer sheath 30 should include a mass sufficient to allow the high electric current to pass through the plasma and generate the Lorentz force on the inner core 20.

Figure 3:
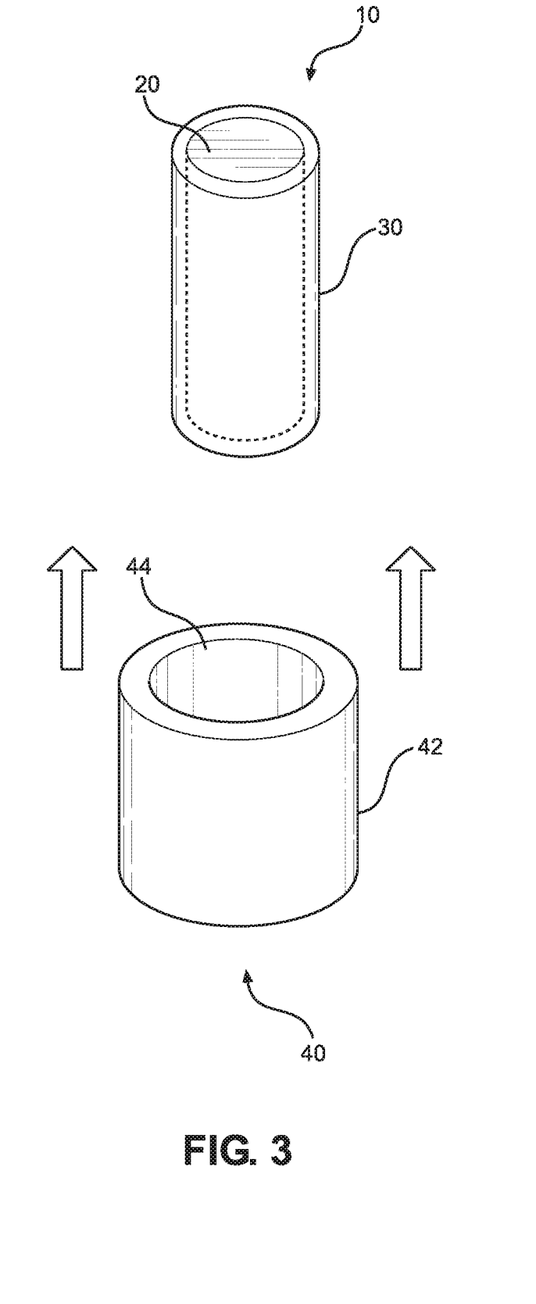
FIG. 3 depicts a diode assembly with a tamper according to one embodiment of the disclosure.

According to certain embodiments, the diode assembly 10 may further include a tamper 40 formed around the electrically conducting metal sheath 30. Referring now to FIG. 3, which depicts an exploded view of tamper 40 with respect to diode assembly 10 of FIG. 1, the tamper 40 is preferably in the form of a second sheath that is closely coupled to the electrically conducting sheath 30. The tamper sheath 40 preferably includes a tamper layer 42 and a non-conductive polymer layer 44. The non-conductive polymer layer 44 (e.g., polyvinyl chloride) is intended to be disposed between the tamper layer 42 and the outer metal sheath 30 of the diode 10 to electrically isolate the tamper 40 from the metal sheath 30 (particularly when the material of the tamper layer 42 has a relatively high electrical conductance as shown in Table 2 below). The length of the tamper 40 is typically shorter than the length of the inner core 20 and corresponding sheath 30 as depicted in FIG. 3 such that the ends of the diode remain exposed to allow for the electrical connections 50 of FIG. 1. The tamper 40, and particularly the tamper layer 42 of tamper 40, serves two primary purposes: (1) to aid in the inertial confinement of the metal plasma, which results in higher compressive forces on the inner core 20, and which subsequently results in more efficient and optimized fusion conditions; and (2) to aid in the neutronics of the fusion event (i.e., tamper 40 serves to reflect neutrons back towards the diode assembly 10 during fusion conditions).

Preferred materials of tamper layer 42 have a combined high density, high melting point, low electrical conductivity, and low cost. The high density provides the inertial confinement of the metal plasma by reflecting energetic neutrons back towards the fusion region. The high melting temperature assures that the tamper layer 42 stays assembled as long as possible. The low electrical conductivity ensures that most of the electrical current passes through the electrically conducting metal sheath 30 to produce a plasma that is as hot as possible. A non-limiting list of potential candidate materials for the tamper layer 42 is provided in Table 2 below:

TABLE 2

Tamper Layer Candidate Materials

| Material | Density (g/cm$^3$) | Melting Point (° C.) | Conductance (S/m × 10$^{-6}$) | ~ Cost ($/lb) | (Density × MP)/ (Conductance × $) |
|---|---|---|---|---|---|
| Beryllium | 1.85 | 1287 | 25 | 3,400 | 0.03 |
| Platinum | 21.45 | 1768 | 9.4 | 13,408 | 0.3 |
| Osmium | 22.3 | 3045 | 12 | 13,490 | 0.4 |
| Rhenium | 21 | 3186 | 5.6 | 1,290 | 9.3 |
| Tungsten | 19.25 | 3422 | 27 | 20 | 122 |
| Niobium | 8.57 | 2468 | 6.7 | 19 | 166.1 |
| Molybdenum | 10.22 | 2617 | 20 | 7 | 191 |
| Uranium | 19.05 | 1135 | 3.1 | 24 | 290.6 |

As indicated above, using the final column of Table 2, uranium will often be the preferred material of the tamper layer 42 given that it has a low conductance, high density, and low cost. Further, uranium has the additional benefit of being able to contribute to the neutron population of the diode assembly 10 since its fissile product produces an abundant neutron flux. In addition to uranium, certain materials such as beryllium may also be added to one or more of the other materials identified above based on their ability to contribute to the neutron population. For example, in certain embodiments, molybdenum could be selected as the primary material of tamper layer 42 based on its low cost and ease of assembly while a relatively small amount of beryllium could be added to the molybdenum to contribute to the neutron population during a fusion event. It should be understood that other factors may dictate other materials for the tamper layer 42. In particular, if the assembly/maintenance time of the diode 10 is an issue, tungsten, niobium, or molybdenum would likely be the preferred materials due to the corrosive nature of uranium in the presence of atmospheric products.

According to another aspect of the disclosure, the overall mass and resulting dimensions of the diode assembly 10 composite will be a function of the desired energy output of a discrete pulsed fusion event. In this regard, as two atoms are joined under fusion conditions, energy is released according to Eqs. 1-3 above. The total energy release from a single pulsed fusion event is the summation of all the individual fusion reactions that take place during that pulse. The starting mass of the diode assembly 10 based upon its diameter, length, and density establishes the maximum number of fusion reactions that can occur from a single pulse. The total number of individual fusion reactions that actually occur is a function of the z-pinch compression pressure, temperature, and the amount of time the z-pinch compression stays assembled before energy released reverses the compression and causes rapid expansion of the remaining diode assembly 10 mass. The tamper 40 works to focus the plasma layer created by the cylindrical conducting outer sheath 30 of 20 inward, further compressing the inner core 20 of fusionable fuel material, which produces higher compression pressure and temperature while holding the z-pinch compression assembled for a longer period of time.

As a result of the teachings described herein, particularly a diode assembly 10 that is formed of an inner core 20 and an electrically conducting outer sheath 30 disposed around the inner core such that a plurality of diode assemblies may be quickly and repetitively inserted into a z-pinch driver, it is believed that use of diode assemblies 10 of the present disclosure may be optimized to include a fusion frequency potential of multiple pulsed fusion events per day.

Alternate embodiments of diode assembly 10 may include advanced methods for liquid injection of molten fusionable fuel into a plasma field compressed by a Lorentz force of the outer sheath 30. However, in such an approach, developing a symmetrical configuration necessary to eliminate the Taylor instabilities would likely be difficult to control.

It should be understood that a diode assembly 10 according to the present disclosure may be fabricated in any number of different manners. In certain embodiments, and particularly when the outer sheath 30 includes highly conductive and/or non-lithium materials as identified in Table 1, conventional deposition methods such as vapor deposition, liquid plating, standard machining, etc. are utilized to form the electrically conducting outer sheath 30 around the inner core 20. Similarly, when the diode assembly 10 includes a tamper 40, conventional deposition methods may be used to form the tamper layer 42 and around the electrically conducting outer sheath 30. If utilized, the non-conductive polymer layer 44 may also be applied to the electrically conducting outer sheath according to a variety of conventional methods such as heat curing.

According to another aspect of the disclosure, the diode assembly 10 as exemplified in FIG. 1 or FIG. 3 may be formed by thermally decomposing the surface region of a fusionable fuel source material (e.g., $^6$LiD, $^6$LiT, $^7$LiD, and $^7$LiT) to produce a metal outer sheath 30 directly from the fusionable fuel source material of the inner core 20. In other words, by thermally decomposing the surface region of a fusionable fuel source material, the present disclosure provides a diode assembly 10 having an electrically conducting outer sheath 30 that is integrally formed around the inner core 20. As should be understood, this type of fabrication has the advantage of the outer sheath 30 of diode assembly 10 being as closely coupled as possible with the inner core 20. Thus, for purposes of the present disclosure, a lithium metal outer sheath 30 "integrally formed" around the inner core refers to an embodiment where the outer sheath 30 is formed at least in part by decomposing the surface of the fusionable fuel source material.

With reference to FIG. 4, and again using $^6$LiD inner core as an example, a method 60 for producing a diode assembly 10 having an electrically conducting outer sheath 30 integrally formed around the inner core 20 is depicted. According to step 62, the polycrystalline, fully-dense $^6$LiD source material (i.e., fusionable fuel source material) is first machined using any of numerous methods as known in the art to the desired dimensions. For example, an abrasive diamond wire saw may be used to machine the fusionable fuel source material to the desired dimensions. In certain embodiments, the source material is machined to about one-centimeter diameter by about two-centimeters in length. However, it should be understood that the shapes and dimensions of the fusionable source material may vary depending upon the total energy planned for a pulsed fusion event using the finished diode assembly 10 and the symmetrical relationship desired between the inner core 20 and the outer sheath 30. In step 64, the machined $^6$LiD source material is placed in a sealed vessel and heated under continuous vacuum conditions thereby generating a vapor pressure typically ranging from about 2.2 torr to about 11.1 torr until the surface of the source material is heated to a temperature typically ranging from about 400° C. to about 680° C., and most preferably between about 600° C. and about 660° C. In step 66, the surface of the $^6$LiD source material is decomposed to $^6$lithium metal and deuterium gas as it is heated to the desired temperature under appropriate pressure conditions of the vessel. During step 66, and while the surface of the source material is decomposing, the deuterium gas is pumped away from the vessel. As a result, referring to step 68, a $^6$lithium metal layer is formed on the surface of the $^6$LiD source material to form a diode assembly 10 having a $^6$LiD inner core 20 with a $^6$Li outer sheath 30 integrally formed around the inner core 20.

Figure 4:
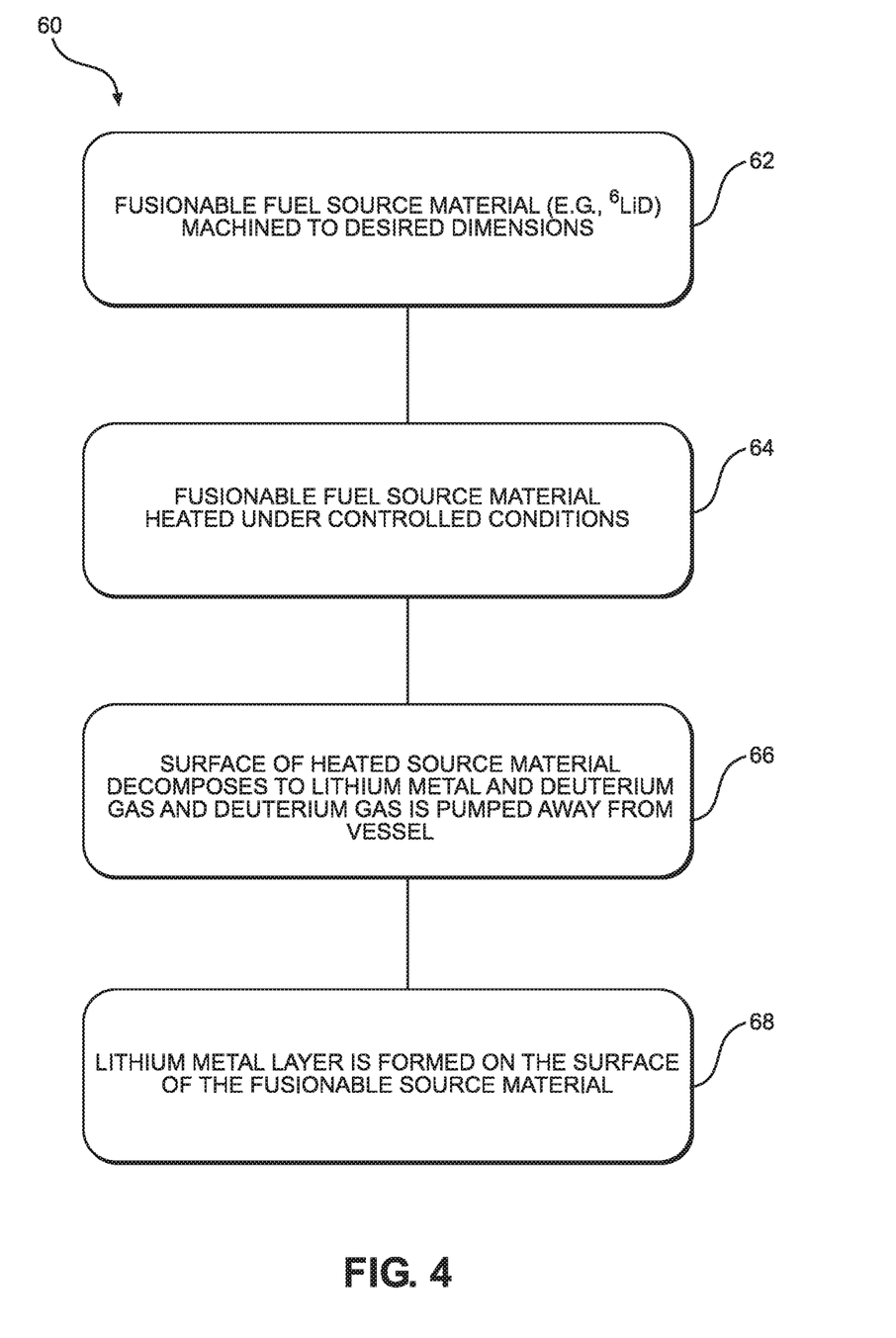
FIG. 4 depicts a process for forming a diode assembly according to one embodiment of the disclosure.

In certain embodiments, and particularly the one-dimensional embodiment of the diode assembly 10 as exemplified in FIG. 2A, one or more ends of the diode assembly 10 may be removed by machining or other known mechanical methods to expose the inner core 20. In this regard, it is noted that the method 60 described above will produce a diode assembly 10 having an outer sheath 30 that encapsulates the inner core 20 (which does not represent a true one-dimensional arrangement as described above with respect to FIG. 2A). Thus, by removing a particular end of the diode assembly 10, the outer sheath 30 is removed at that end to expose the inner core 20 following step 68 of method 60. In other embodiments, the inner core 20 may remain encapsulated within the outer sheath 30. In this embodiment, the diode assembly 10 may be bonded by melting and/or uniting the outer sheath 30 with other electrically conductive materials prior to the pulsed fusion event to aid in the assembly with the z-pinch driver.

Figure 5:
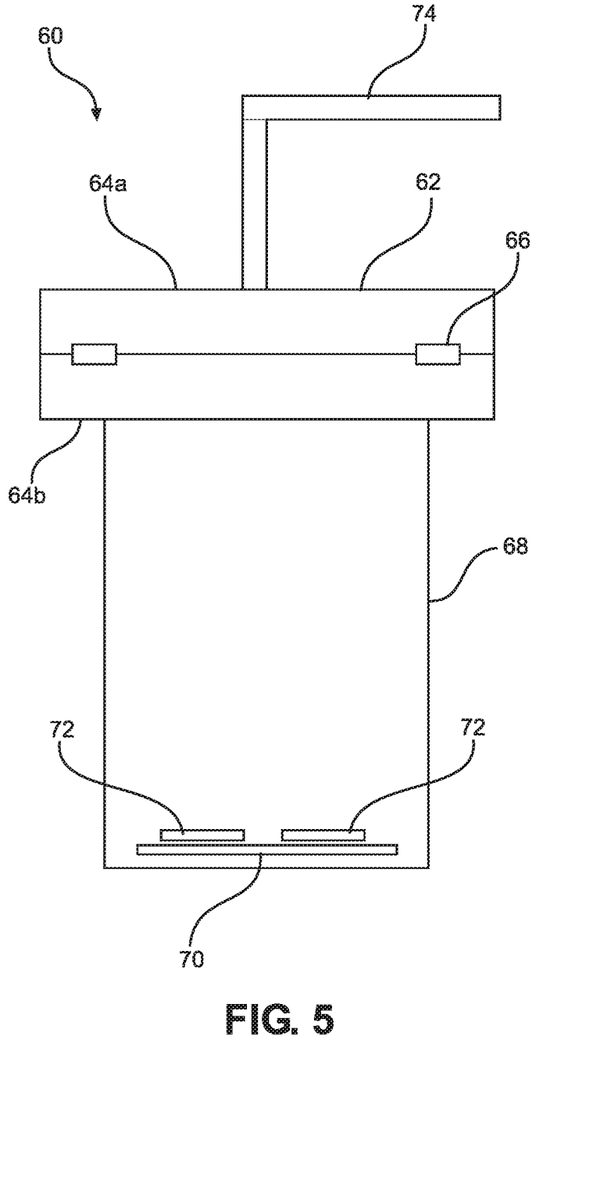
FIG. 5 depicts a sealed vessel for decomposing the surface of a lithium fuel source material according to one embodiment of the disclosure.

With reference to FIG. 5, an exemplary vessel 60 to be used in steps 64-68 of method 60 is depicted. According to this embodiment, the sealed vessel 60 includes an upper portion 62 with two conflat flanges 64a and 64b sealed together with gasket 66. The sealed vessel further includes a bottom portion 68 welded to the bottom conflat flange 64b. A separator 70, such as a screen, mesh, or other device is preferably placed in the bottom of the bottom portion 68 to reduce direct contact between the fuel source and the interior surface of the bottom portion 68 to prevent the lithium metal from adhering to the vessel 60. The separator preferably is of a suitable material having a melting point above the melting point of the fuel source and the bottom portion 68, and preferably of stainless steel. Multiple fusionable fuel elements 72 are placed on the stainless-steel separator 70 after being machined to the desired dimensions in step 62. Tubing 74 is welded to the top flange 64a and connected to a vacuum source (not shown). Once sealed, a vacuum is applied to the vessel 60 and the vessel 60 is heated to the desired temperature and held for the desired hold time such that a lithium metal layer is formed on the surface of the fuel elements 72 the deuterium gas is pumped out of the vessel 60 through tubing 74.

Figure 6:
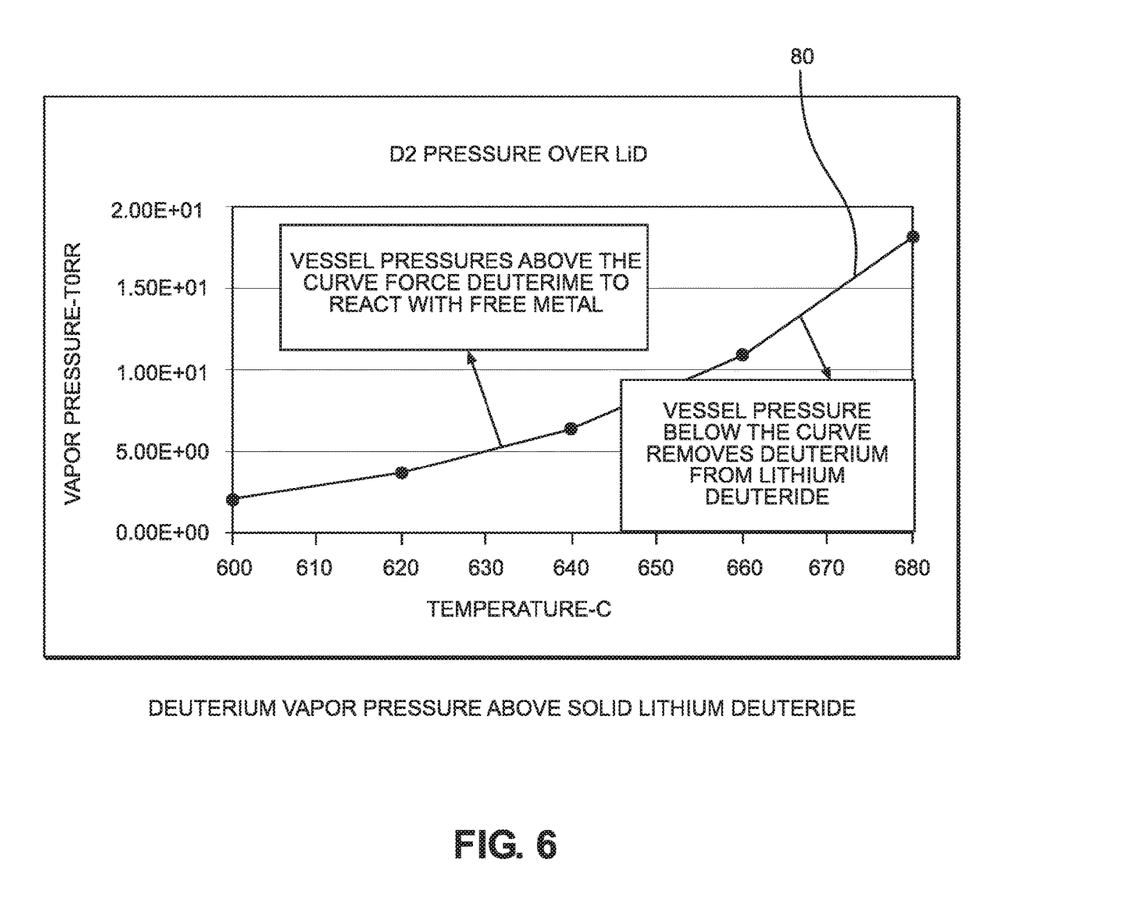
FIG. 6 depicts a graphical comparison of a vessel vapor pressure to the surface temperature of a $^6$LiD fuel source material for removing deuterium gas from the heated $^6$LiD fuel source material according to one embodiment of the disclosure.

Referring to FIG. 6, a vapor pressure curve 80 is illustrated comparing the vessel vapor pressure to the surface temperature of the $^6$LiD source material during step 66 of FIG. 4. According to FIG. 6, when the sealed vessel pressure is held below the vapor pressure curve 80, deuterium gas is removed from the $^6$LiD source material. In contrast, when the sealed vessel pressure is held above the vapor pressure curve 80, the deuterium reacts with free metal from the $^6$LiD source material. Thus, during step 66 of FIG. 4, it is critical to keep the vapor pressure of the vessel below the curve 80 as the surface temperature of the $^6$LiD source material is increased. Relatedly, in preferred embodiments, the $^6$LiD source material is heated in steps 64-66 of FIG. 4 under continuous vacuum conditions where the pressure of the vessel is gradually raised as the temperature of the $^6$LiD source material rises. By gradually raising both the pressure and the temperature within the vessel, the decomposition rate is sped up while keeping the sealed vapor pressure below the curve 80. However, if the temperature is raised too high (i.e., typically about 690° C.), the source material will begin to melt and lose its shape.

Figure 7:
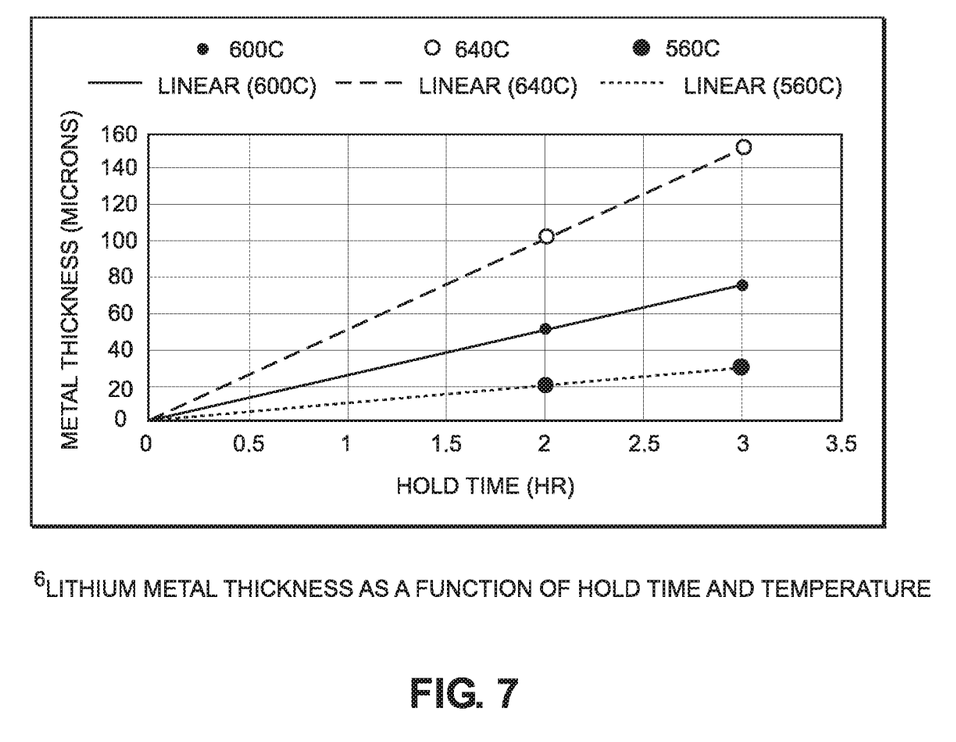
FIG. 7 depicts a graphical illustration of the thickness of the lithium metal outer sheath as a function of the time and temperature at which the surface of a $^6$LiD fuel source material is held in a sealed vessel pressure.

Referring to FIG. 7, the thickness of the $^6$lithium metal outer sheath 30 formed in step 68 of FIG. 4 is controlled based on the time and temperature at which the $^6$LiD is allowed to decompose in the vessel during step 66. For example, referring to the example of FIG. 7, the thickness of the $^6$lithium metal outer sheath 30 can be adjusted between about ten microns to about one hundred and fifty microns by adjusting the temperature of the vessel between about 560° C. to about 640° C. and the heating time between about one hour to about three hours. In preferred embodiments, thicker layers of $^6$lithium metal of the outer sheath 30 are obtained by increasing the heating time until the mass of the outer sheath 30 matches that of the resulting inner core 20 such that momentum transfer between the two elements is better matched.

While the method of FIG. 4 and the charts of FIGS. 6-7 are shown and described with respect to a $^6$LiD source material, it should be understood that diode assemblies 10 having an integrally formed electrically conducting outer sheath 30 formed around its inner core 20 may be formed from other fusionable fuel source materials such as $^6$LiT, $^7$LiD, and $^7$LiT using similar steps.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A method of forming a diode assembly for producing a pulsed fusion event in a z-pinch driver, the method comprising:
   providing a fusionable fuel source material including a lithium compound formed of one or more lithium isotopes and one or more hydrogen isotopes;
   heating the fusionable fuel source material under controlled conditions in a vacuumed environment such that a surface of the fusionable fuel source material decomposes to lithium metal and a hydrogen isotopic gas leaving an inner core of undecomposed fusionable fuel source material; and
   extracting the hydrogen isotopic gas from the vacuumed environment to form the diode assembly having a lithium metal outer sheath integrally formed around the inner core of undecomposed fusionable fuel source material.

2. The method of claim 1 wherein the fusionable fuel source material is selected from a group consisting of $^6$LiD, $^6$LiT, $^7$LiD, and $^7$LiT.

3. The method of claim 1 wherein the controlled conditions include a vapor pressure ranging from about 2.2 torr to about 11.1 torr.

4. The method of claim 1 wherein the surface of the fusionable fuel source material is heated to a temperature ranging from about 400° C. to about 680° C.

5. The method of claim 1 wherein the surface of the fusionable fuel source material is heated to a temperature ranging from about 600° C. to about 660° C.

6. The method of claim 1 wherein the controlled conditions include a vapor pressure ranging from about 2.2 torr to about 11.1 torr and the surface of the fusionable fuel source material being heated to a temperature ranging from about 400° C. to about 680° C.

7. The method of claim 6 wherein the heating step includes raising the vapor pressure of the vacuumed environment as the temperature of the surface of the fusionable fuel source material increases.

8. The method of claim 1 further comprising controlling a thickness of the lithium metal outer sheath between about ten microns and about 150 microns by selecting the controlled conditions to include a temperature between about 560° C. to about 660° C. and a heating time between about one hour to about three hours.

9. The method of claim 1 wherein the heating step includes controlling a thickness of the lithium metal outer sheath by adjusting an amount of time in which the fusionable fuel source material is heated under controlled conditions in the vacuumed environment.

10. The method of claim 1 wherein the heating and extracting steps are performed in a sealed vessel having a separator disposed between the fusionable fuel source material and an interior surface of the sealed vessel.

* * * * *